(12) United States Patent
Chow

(10) Patent No.: US 7,877,317 B2
(45) Date of Patent: Jan. 25, 2011

(54) METHOD AND SYSTEM FOR FINDING SIMILAR CHARTS FOR FINANCIAL ANALYSIS

(75) Inventor: Jyh-Herng Chow, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1100 days.

(21) Appl. No.: 11/603,853

(22) Filed: Nov. 21, 2006

(65) Prior Publication Data

US 2008/0120123 A1 May 22, 2008

(51) Int. Cl.
*G06Q 40/00* (2006.01)
(52) U.S. Cl. ....................................... 705/37
(58) Field of Classification Search ................. 705/37
See application file for complete search history.

(56) References Cited

U.S. PATENT DOCUMENTS

| | | | | |
|---|---|---|---|---|
| 5,694,535 | A * | 12/1997 | Broekhuijsen | 345/442 |
| 6,907,404 | B1 * | 6/2005 | Li | 705/36 R |
| 6,910,017 | B1 * | 6/2005 | Woo et al. | 705/10 |
| 6,968,326 | B2 * | 11/2005 | Johnson et al. | 706/14 |
| 2003/0194135 | A1 * | 10/2003 | Wenzel | 382/209 |
| 2006/0015425 | A1 * | 1/2006 | Brooks | 705/35 |
| 2006/0235786 | A1 * | 10/2006 | DiSalvo | 705/37 |
| 2007/0083452 | A1 * | 4/2007 | Mayle et al. | 705/36 R |
| 2007/0282730 | A1 * | 12/2007 | Carpenter et al. | 705/36 R |
| 2008/0065510 | A1 * | 3/2008 | Yu | 705/27 |
| 2009/0216684 | A1 * | 8/2009 | Helweg | 705/36 R |
| 2009/0259599 | A1 * | 10/2009 | Wallman | 705/36 R |

OTHER PUBLICATIONS

Lo et al.: Foundation of technical analysis: Computational algorithms, statistical inference, and empirical implementation, Journal of Finance, Aug. 2000, vol. IV, No. 4, pp. 1705-1765.*
Business Editors: Washington Mutual announces website tools that estimates a stock's future performance. Business Wire, New York, Dec. 21, 2000, pp. 1-2.*

* cited by examiner

*Primary Examiner*—Hani Kazimi
*Assistant Examiner*—Bijendra K Shrestha

(57) ABSTRACT

Embodiments of the invention concern finding correlations between related traded items, such as securities, commodities, currencies, or contracts. The pricing information of multiple traded items from one or more markets is analyzed and a user is provided with a listing of pairs or larger groups of traded items which are most closely correlated. Another embodiment of the invention is a system and method for finding the most related traded item to a particular predefined item. Another embodiment of the invention is a system and method for finding the traded item whose trading history is closest to a predefined curve.

31 Claims, 7 Drawing Sheets

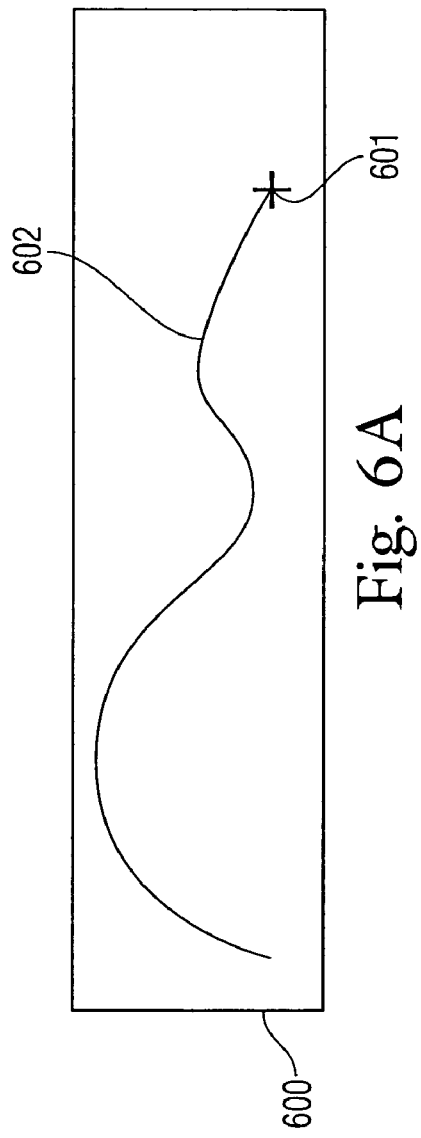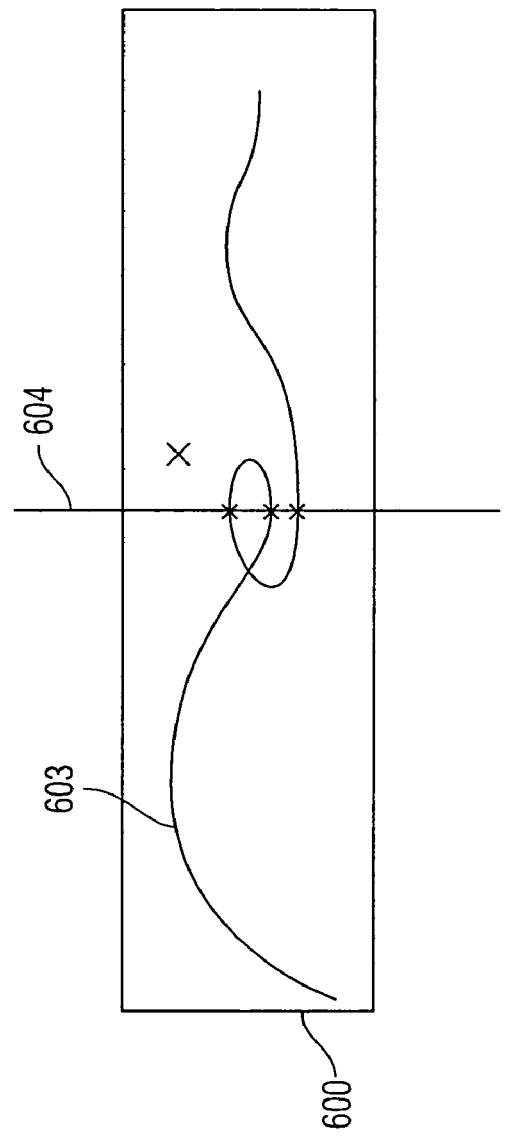
Fig. 6A
Fig. 6B

METHOD AND SYSTEM FOR FINDING SIMILAR CHARTS FOR FINANCIAL ANALYSIS

BACKGROUND OF THE INVENTION

1. Field of the Invention

The invention is related to financial analysis and, more particularly to the comparison of pricing charts.

2. Description of the Related Art

Today, multiple markets exist which trade various items of value. Items of value may be commodities such as iron, gold and oil, or securities such as stocks and bonds or various currencies. Furthermore, contracts such as options (contracts to buy or sell an item at certain price) and others may also be traded. Some more innovative markets trade contracts which promise payment upon the occurrence or non-occurrence of a certain predefined event (thus essentially trading "bets").

Some markets provide detailed information as to the prices of the items traded. Examples of such markets include almost all of the well known financial markets, such as NASDAQ, NYSE, etc.

It is well known that multiple persons, professionals and amateurs alike, attempt to profit from markets by anticipating the future price movements of the traded item. There exist multiple tools, methods and theories used for guessing a future price movement of a traded item. Many of these methods rely on finding a correlation between two or more items. Correlations may be valuable for a variety of reasons, the most apparent being that once a correlation between two items is found, one may anticipate a movement of the price of one of the items based on the price of another related item.

Furthermore, if an investor is interested in a particular item (e.g., a stock), that investor may wish to find other items which are correlated to it. This may be the case because such correlations often show some kind of business relationship between the two items (for example, the stock of a company may be closely correlated to the price of a raw material it uses in its business), and thus the investor may be interested in discovering such relationships in order to learn more about the stock he/she is interested in. Alternatively, the investor may like the price history of the stock and may be looking for other stocks with the same price history to invest in.

A correlation is any relation of the prices of two items over time. Examples of known correlations, are the prices of oil and natural gas, which are believed to follow each other, the prices of stocks and bonds (or, put another way, the yields of bonds and the changes in stock prices) which are believed to be inversely related, the prices of stocks of goods-producing companies and transport companies which are also believed to follow each other, or the price of a commodity and the currency of a country producing that commodity in large volumes.

While there are many known correlations between different pairs or groups of traded items, most of these well known correlations are thoroughly exploited by institutional traders. Therefore it is not easy for most investors to realize profits from relying on these well known correlations. Thus, it may be valuable for an investor to find a correlation which is not so well known.

However, the information provided by present markets is usually overwhelming. It is not practicable for most investors to look over thousands upon thousands of listings to attempt to find a correlation. For example, at the time of this writing the NYSE has more than 2600 listings.

With the rising popularity of investing, providing informational services to investors has become a lucrative business. Currently, various websites provide such informational services and many of these websites are looking for additional services which would differentiate them from the competition and attract more investors.

Another method which investors use to attempt to predict future trading prices of various items is technical analysis. Technical analysis is the practice of attempting to predict a future price of a listing by analyzing the previous price history of that listing. Technical analysts believe that certain shapes of price charts provide clues as to what the price will be in the future. Thus, it may be beneficial for certain investors (for example, technical analysts) to find stock whose price history most closely matches a certain predefined curve.

What is needed is a way to automatically find pairs or groups of correlated traded items. Also, needed is a way to find the traded item or items which are most closely correlated to a particular given traded item. Also needed is a way find a particular traded item whose price history most closely resembles a predefined curve.

SUMMARY OF THE INVENTION

Embodiments of the invention concern the determination of correlations between related traded items, such as securities, commodities, currencies, or contracts. The invention analyzes the pricing information of multiple traded items from one or more markets, and provides a user with a listing of pairs or larger groups of traded items which are most closely correlated.

Another embodiment of the invention is directed to finding the most related traded item to a particular predefined item. Another embodiment of the invention is directed to finding the traded item whose trading history is closest to a predefined curve.

Embodiments of the invention perform the above by automatically performing various mathematical operations which may process and compare various data representing the pricing histories of various traded items or one or more predefined curves. This automatic processing may be performed by a computer, or other type of machine capable of automatic calculation.

Accordingly, embodiments of the invention may include a main server which is connected to a pricing data server and a user computer. The pricing data server provides pricing information; the main server processes the information to find correlated traded items and then sends the information to the user at the user computer. The user computer may be a general purpose computer running a web browser. The main server may be a web server connected through the user computer through the Internet. Alternatively the main server may be separated into a data processing server which performs most computations and an internet server which receives the results from the computations from the data server and sends the results over the Internet to a browser running on a user computer.

BRIEF DESCRIPTION OF THE DRAWINGS

FIG. 6A is a diagram of a correctly entered curve.

FIG. 6B is a diagram of an incorrectly entered curve.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the invention is not intended to be limited to the examples described herein and shown, but is to be accorded the scope consistent with the claims.

Figure 1:
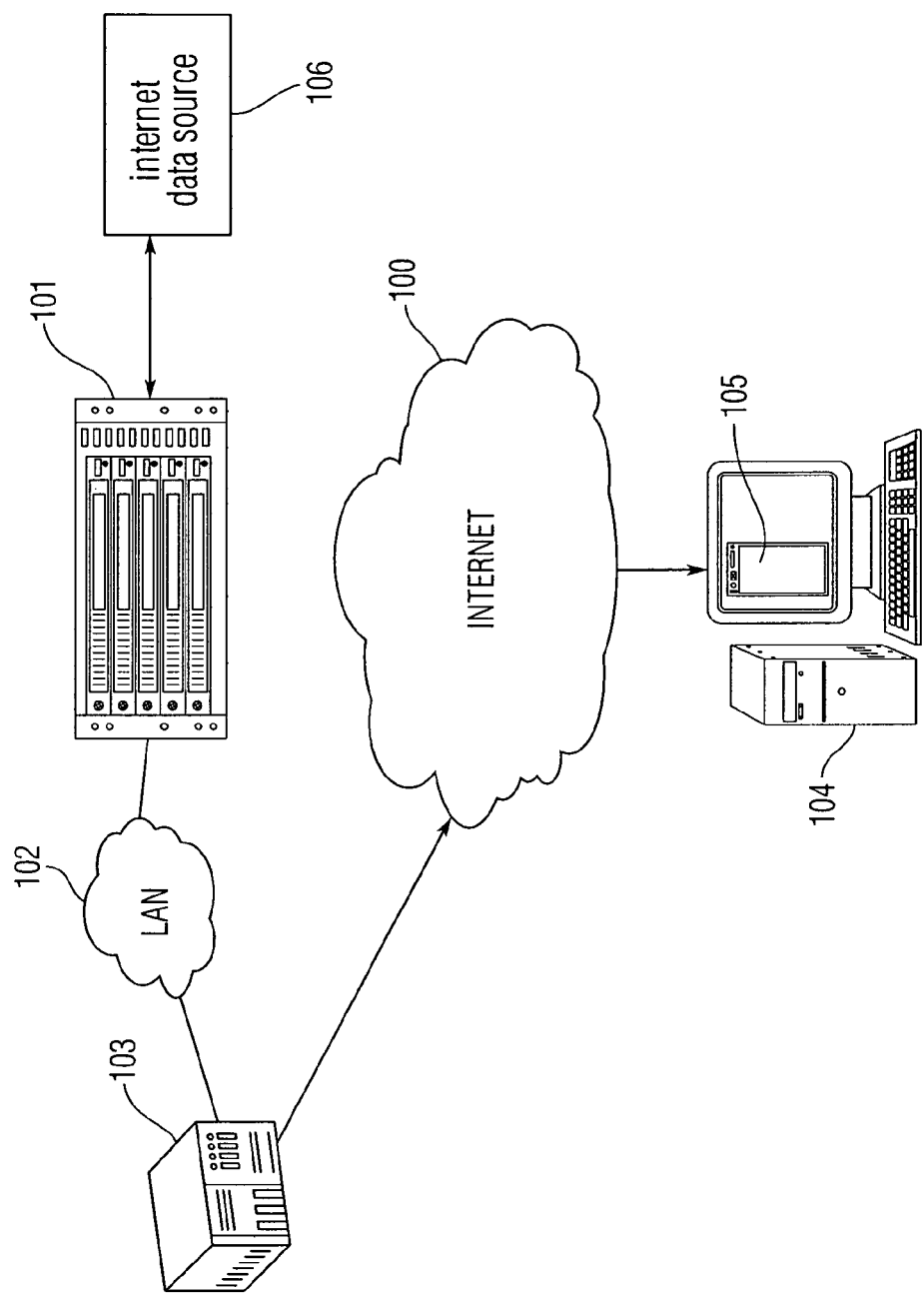
FIG. 1 is a diagram of an embodiment of the invention and the environment in which it operates.

FIG. 1 is a diagram of an embodiment of the invention and the environment it operates in. In this embodiment, the invention is implemented on a data processing server 101 that performs the majority of calculations in order to find similar charts, and an internet server 103 that receives results from the data processing server, places them in a web browser accessible format (i.e., embeds images of charts received from the data processing server into webpages) and sends the results over the Internet 100 to a user computer 104.

In an alternative embodiment, the internet server 103 and the data processing server 101 may be implemented on a single server. However, if they are implemented on different machines, the relatively large computational load of the data processing tasks will not affect the response time of the internet server, thus avoiding the impression of a slow, sluggish website.

The internet server 103 and the data processing server 101, whether implemented as one or distinct entities, may be comprised of multiple machines which may perform the tasks of the invention under known distributed or parallel computing methods.

The internet server 103 and the data processing server 101 may be connected through a LAN 102. The LAN may be implemented using Ethernet, or higher performance network connections, such as, for Example Fiber Channel. Alternatively, these two servers may be connected through a WAN or even the Internet.

A market data source 106 is connected to the data processing server 101 and provides pricing data for the various traded items. Multiple market data sources may be used. The market data source may be connected to the data processing server through a direct connection, a LAN, a WAN or another type of network.

The user computer may be any computing device, such as a personal computer, a mobile device, a cellular phone, etc. The personal computer may execute a web browser 105, through which a user may obtain the information provided by the internet server.

Figure 2:
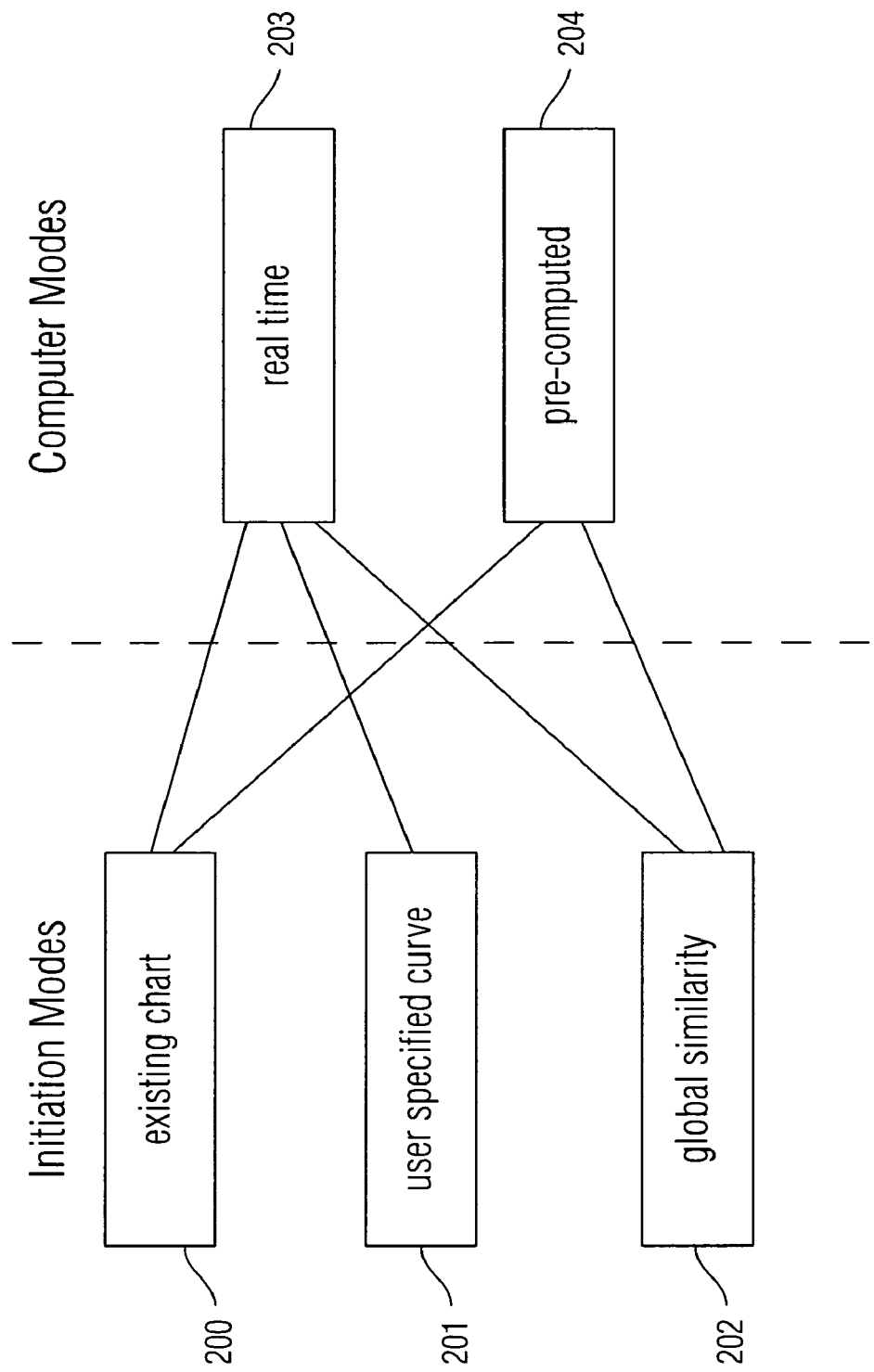
FIG. 2 is a diagram showing various modes under which embodiments of the invention may operate.

FIG. 2 is a diagram showing various modes under which embodiments of the invention may operate. There are three initiation modes. The initiation modes refer to the operation which the present system must perform for the user. The initiation modes are as follows: the existing chart mode 200, the user specified curve mode 201 and the global similarity mode 202.

In the existing chart mode 200, a user specifies an existing chart showing the price movements of a traded item (for example, by selecting a stock symbol). The present system then finds one or more other charts of other traded items that are similar to the user specified chart.

In the user specified curve mode 201, a user enters a curve, and the present system provides the user with one or more charts of traded items which are similar to the user specified curve.

In the global similarity mode 202, the user does not specify a chart or a curve. Instead the system provides the user with pairs or larger groups of charts of traded items that are very similar to each other.

There are also two computation modes under which embodiments of the invention may operate. Computation modes refer as to how the computations required by the present system are performed. These include the real time mode 203 and the pre-computed mode 204. In the real time computation mode 203, computations are done in real time in response to a user's request. In the pre computed computation mode 204, computations as to the similarities between various traded item charts are performed before the user request and the results are stored. When the user does make a request, the system uses the stored results to respond to the request in a more rapid fashion.

A specific overall mode of operation of the present system may be defined by a combination of an initialization mode and a computation mode. As FIG. 2 shows, the existing chart and the global similarity initialization modes may be used alternatively with both the real time and pre computed computation modes. However, the user specified curve mode may only be used with the real time computation mode. Because the system has no previous knowledge of what type of curve a user may enter before a user's request, there are not many useful computations which may be performed before the user's request.

Embodiments of the invention may feature different overall modes of operation. Some embodiments feature all overall modes of operation shown by FIG. 2 and allow a user or an operator to choose between them.

There are some mathematical operations which are performed by the invention, regardless of which mode it is operating in. Two of these are normalization and similarity determination.

Normalization is used to change the data points of a chart so that the chart retains its overall shape, yet all the data points fit in a certain standard predefined range. The predefined range may be (0,1). Thus, when two normalized graphs are being compared, the comparison will be based on the respective shapes of the two graphs only. There are several known mathematical methods of performing normalization. For example, if a chart within a predefined range (period of time) is defined a by a plurality of data points $d(1) \ldots d(n)$, first the highest value of any data point (max) and the lowest value of any data point (min) are determined. The normalized chart is then a chart comprising of a plurality of data points $d.norm(1) \ldots d.norm(n)$ such that for each i between 1 and n, the following is true:

$$d.norm(i) = (d(i) - min)/(max - min) \qquad (EQ 1)$$

While the above equation describes the normalizing of the magnitude of the charts, the time interval or the resolution of the charts may also require normalization. Resolution refers to the time period designated by each data point in the chart.

In one embodiment, the time period is a day; in other words, each data point of each chart signifies the price for a particular day (usually that day's closing price).

However, if two charts with different data point resolutions are to be compared, then the resolutions must be normalized. Usually, the resolution gets normalized to a predefined display resolution value. As stated above, the display resolution value may be, for example one day. Some embodiments may direct the user to select a different value.

A chart that is at a higher resolution than the display resolution is normalized by reducing the number of data points. Data points may be reduced by, for example, removing all but the last data point of a group of successive data points. Thus, for example, if a chart has a resolution of one day, while the display resolution is one week, the chart may be modified by removing the data points for each day of the week but Friday (Friday usually being the last data point of the week for financial charts). Alternatively, to reduce the number of data points in a chart, groups of data points may be replaced with a data point having a value equal to the average of the replaced data points. In the above example, the data points for the days of a week may be replaced by a single data point equaling the week average price.

If a chart has a lower resolution than the display resolution, additional data points must be added. Data points may be added according to a simple straight line fitting, where it is assumed that the graph moves in straight lines between each available data point, and the values of the new data points are selected so they fit in these straight lines. Alternatively, the new data points may be placed in accordance of some known curve fitting algorithms, such as polynomial interpolation.

Similarity determination is the process of deriving a value which measures the similarity of two normalized graphs. Again there are several known mathematical methods for measuring similarity. One possible method is the least square method. If two charts which are to be compared are defined by vectors $U(u(1) \ldots u(n))$ and $V(v(1) \ldots v(n))$, wherein each vector comprises a plurality of values (u and v respectively), and each value defining a data point of the respective chart, then a similarity function between two vectors sim(U,V) may be defined as:

$$\mathrm{sim}(U,V) = -\mathrm{sum}((u(i)-v(i))^2) \quad (EQ2)$$

where the "sum" function provides the sum of the encapsulated equation for each i from 1 through n.

A negative sign may be used at the sum function, because ordinarily (without the negative sign) the sum function listed above would provide lower results when the vectors are similar and higher results when they are not. Thus, the negative sign causes the sum function to provide higher values for more similar vectors. Therefore, it can be stated that, as defined above, the similarity function is higher when the similarity between two charts is higher. Naturally, a person of skill in the art would recognize that some embodiments may use a version of EQ2 which does not have a negative sign before the sum function.

Alternatively, cosine based similarity may be used. Considering the two charts represented by vectors U and V discussed above, cosine based similarity is computed by simply taking the cosine of the angle between these two vectors. In other words, cosine based similarity is defined by:

$$\mathrm{sim}(U,V) = \cos(U,V) \quad (EQ3)$$

Naturally, vectors U, V are usually multi-dimensional due to the relatively large number of data points comprised by the charts they represent. More specifically, U and V are n-dimensional. There are well known mathematical methods of taking the cosine of two multidimensional vectors.

Some of the above discussion assumes that a chart includes plurality of data points, wherein each data point defines a magnitude. This format of defining a chart is referred to as the simple magnitude format. Thus, according to the simple magnitude format, a stock chart would include a plurality of price points. However, embodiments of the invention may operate with charts which may be defined in different manner.

For example, a chart may be defined by one or more reference data points which define a magnitude and a plurality of delta data points which merely define a difference from the magnitude of a nearby reference data point. This will be referred to as the delta format. A person of skill of the art would recognize that embodiments of the present invention may utilize charts defined in the above discussed delta format.

Persons of skill in the art would recognize that if charts having an alternative format are used, a different similarity function may need to be implemented to correctly compare the charts and determine similarity scores for them. Alternatively, the charts may all be converted to the simple magnitude format discussed above, so that the functions described above may be used.

Some embodiments may be utilized in connection with a set of charts that are defined in different formats. These embodiments may convert the various charts to a single format as part of normalization, so that the comparison step may be performed on similarly formatted charts.

Figure 3:
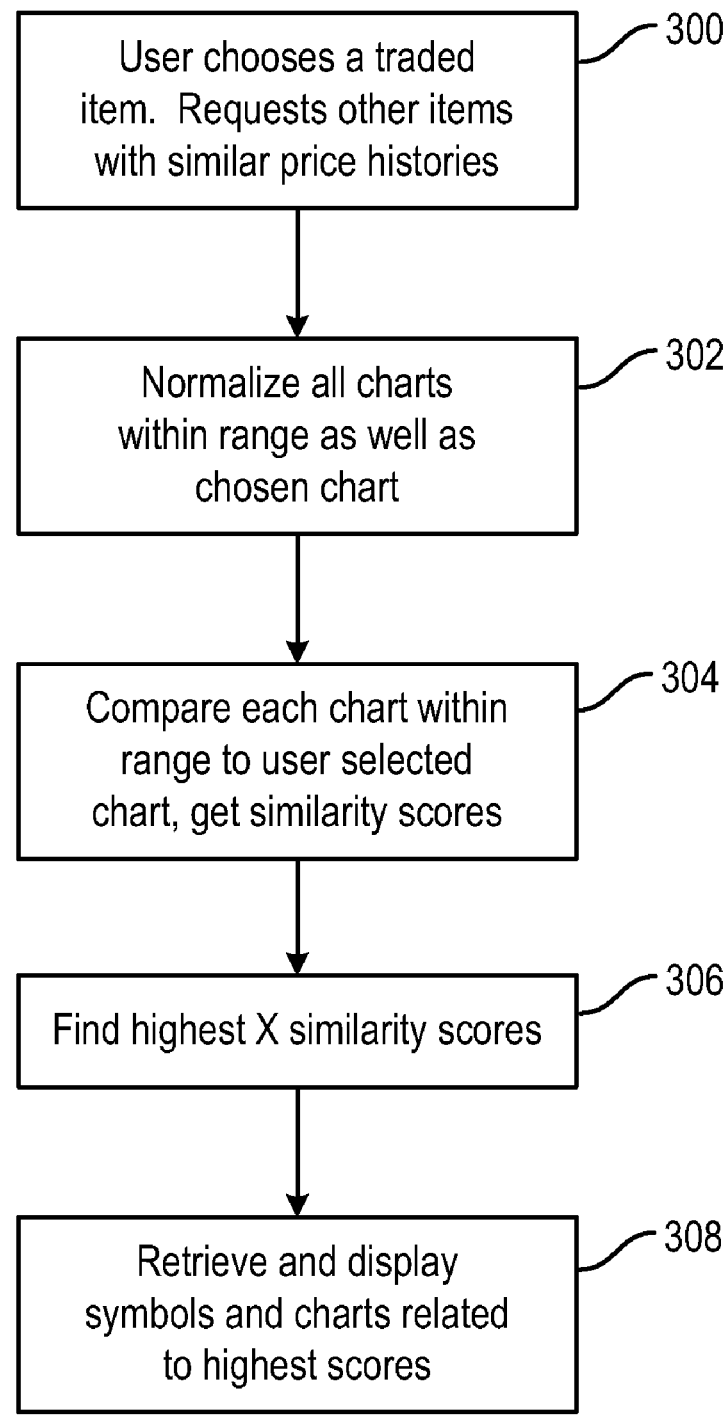
FIG. 3 is a flow chart showing a method according to which an embodiment of the invention operates in the existing chart and real time overall mode.

FIG. 3 is a flow chart showing a method according to which an embodiment of the invention operates in the existing chart and real time overall mode. At step 300, a user chooses a traded item and requests other items with similar price histories. The user may do this when browsing financial information on the web.

In some embodiments, a financial website may have multiple features, such as quotes, articles, stock analysis tools, etc. Thus, the system of the invention is merely one of many available tools of a financial information and services website. Consequently, when a user accesses a graph for a traded item under any context, the user may have the option to utilize an embodiment of the invention in order to find graphs of other traded items that are similar to the accessed graph.

At step 300, the user may optionally choose additional attributes, such as the length of the graph which is to be matched (a possible default value is one year) and the resolution on which the matching is to be based on (i.e. the display resolution discussed above). A possible default for the resolution is one day.

Another option the user may choose is the range of the comparison. In other words, the user may choose whether the comparison is to be based on stocks only, or stocks and bonds and currencies, or stocks from particular markets only, etc. In one embodiment, the range encompasses stocks listed at the major American markets (NYSE and NASDAQ) only.

In step 302 all charts within the range of comparison as well as the chart chosen by the user are normalized. Magnitude and/or resolution-based normalization may be performed. In step 304, each chart within the range is compared to the selected chart and a similarity score is derived from each such comparison.

At step 306, the x highest similarity scores are located. The number x is an attribute that indicates how many similar graphs are to be shown to the user. Its value may vary with each specific implementation of the present system and depends mostly on graphical user interface issues.

The highest similarity scores may be determined by sorting the similarity scores according to a known sorting algorithm, or alternatively by scanning the similarity scores while keeping a running list of the highest scanned scores. When the highest similarity scores are retrieved, they are saved along with identifiers of the charts which were compared to achieve these scores.

At step 308, the symbols and charts associated with the highest similarity scores are retrieved and displayed.

It should be noted that the discussion above refers only to the existing chart and real time overall mode. When the existing chart and pre-computed overall mode is used, the operation of the present system is as follows.

A pre-computation operation is executed periodically. The pre-computation operation may be executed at around 2 AM every night when the various servers are least likely to be busy. The pre-computation operation essentially performs steps 302-306 of FIG. 3 for each traded item chart within a predefined range, and stores the discovered x highest results for each chart.

When a user utilizes the present system in the existing chart and real time overall mode, he/she selects a chart in accordance to step 300. However, steps 302 through 306 are not performed at this time. Instead, the system accesses its storage and retrieves the list of the x highest results for the chart selected by the user. Then, in accordance with step 308, the symbols and charts associated with the retrieved highest scores are displayed.

Thus, the existing chart and pre-computed overall mode provides better response times, because steps 302-306 need not be performed after each user request. Instead the system relies on cached results of previously performed computations. However, this mode relies on slightly outdated information, since the computations are usually performed based on data from the previous night. Furthermore, the real time mode offers more flexibility as to which additional parameters (i.e. length of charts used for comparison, resolution of charts used for comparison) the user may choose.

Figure 4:
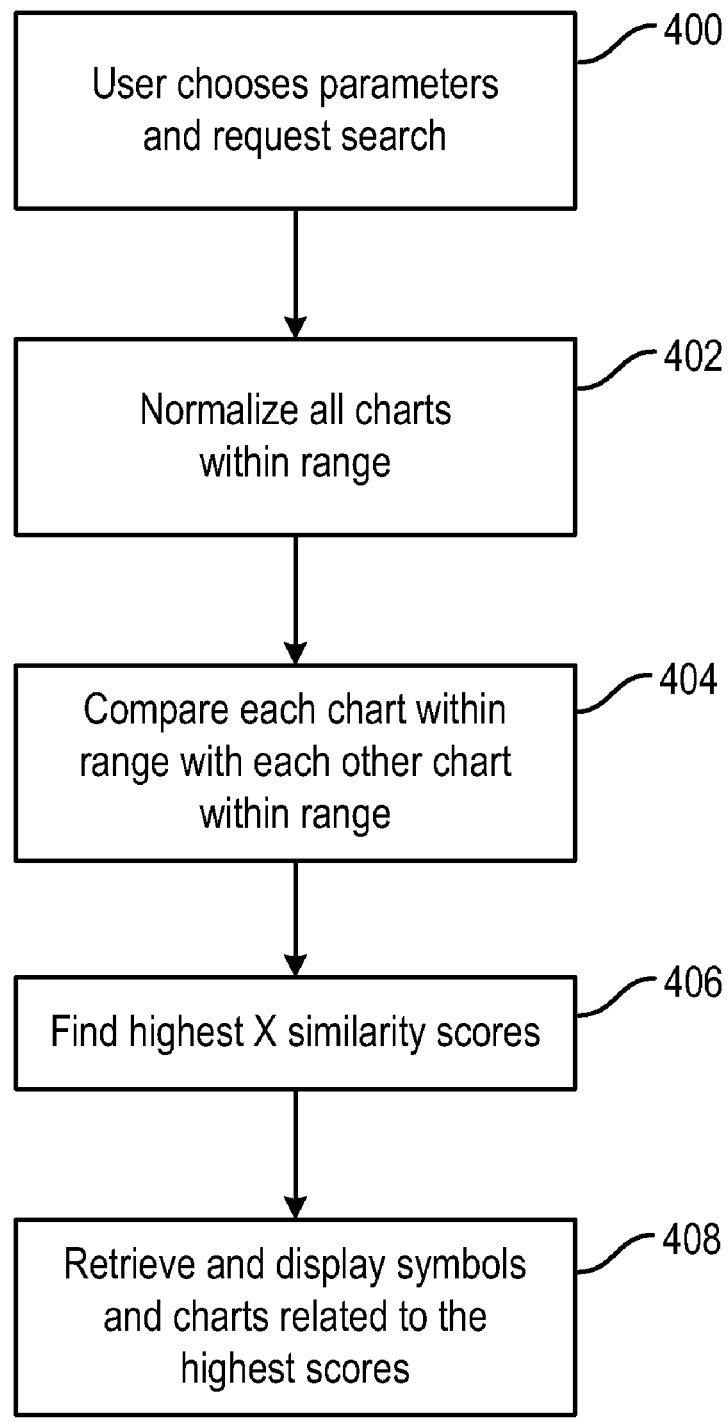
FIG. 4 is a flow chart showing a method according to which an embodiment of the invention operates in the global similarity and real time overall mode.

FIG. 4 is a flow chart showing a method according to which an embodiment of the invention operates in the global similarity and real time overall mode. At step 400, the user chooses various parameters and requests a global similarity search. Again, these parameters may be the length of charts to be compared, the resolution of charts, the range of charts, etc. Note, that in this case the user does not choose a chart on which the comparison is to be based. Naturally, default values may be provided and the user may skip this step altogether.

At step 402, all charts within the range are normalized. Again, normalization may be based on magnitude, resolution, or both. At step 404, each chart within the range is compared with each other chart within the range. The similarity score obtained from the comparison of each pair of charts is stored. At step 406, the x highest similarity scores are determined. At step 408, the pair of symbols and charts related to the highest scores are retrieved and displayed. In one embodiment, similar charts are displayed in pairs.

The global similarity and pre-computed overall mode differs from the mode described above in that steps 402 through 406 are pre-computed. More specifically, at a periodic time (e.g., 2 am each night) the system normalizes all charts within a predefined range, compares each possible combination of charts within the range and finds and saves the x highest similarity scores.

When a user requests a global similarity search, the system merely retrieves the list of x highest similarity scores and displays the symbols and charts associated with these scores.

It should be noted that the pre-compute computations of the existing chart pre-compute mode and the global similarity pre-compute mode are very similar. Therefore, embodiments of the invention which feature both of the above modes may achieve efficiencies in their pre-computations. These embodiments need to compare each stock with each other stock within the range only once each pre-compute stage. They merely need to keep two types of lists of similarity scores. One type includes a plurality of lists comprising the highest scores of for each particular chart, and the other type includes a single global list comprising the highest scores for any pair of charts within the range.

The system may cache the results of these previously performed computations. The system may also implement a cache policy that causes cache results to be automatically invalidated/expired after a predefined period of time to prevent stale cached results.

Figure 5:
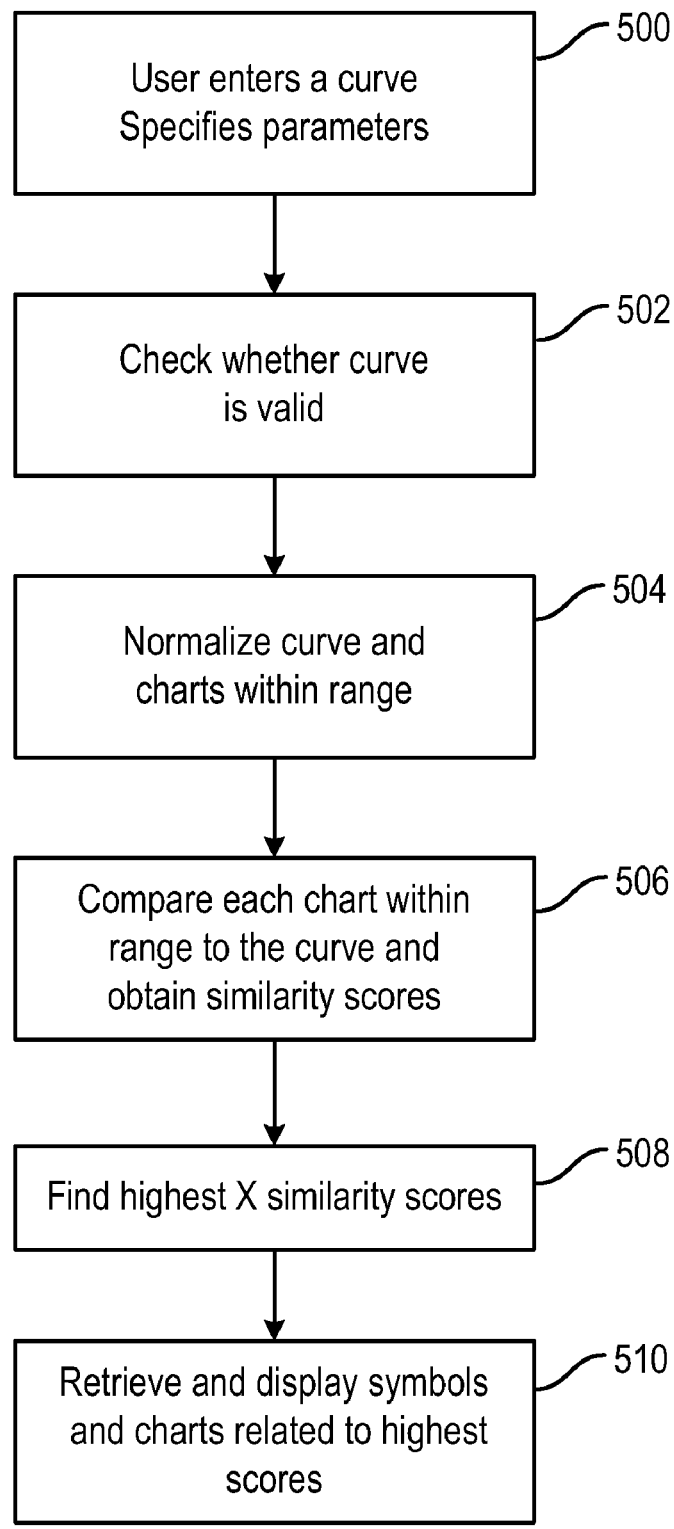
FIG. 5 is a flow chart showing a method according to which an embodiment of the invention operates in the user specified curve mode.

FIG. 5 is a flow chart showing a method according to which an embodiment of the invention operates in the user specified curve mode. Note that the user specified curve mode may only be combined with the real time mode. Therefore, in the interest of brevity, the phrase "user specified curve and real time mode" is shortened to "user specified curve mode".

At step 500, the user enters a curve and optionally enters search parameters (see above for more detailed discussion for parameters). The user may enter a curve using any suitable computer input device.

The user may be directed by software of the invention to utilize a mouse and move a cursor in a blank canvas field. With reference to FIG. 6A, the canvas field may be similar to field 600. The user is then directed to press a mouse button and move the mouse. Once a mouse button is pressed, a software of the present system draws a line which follows the moving mouse cursor 601. Thus, a curve 602 may be drawn.

The software may be loaded on the user's computer 104 by the user. However, in another embodiment, the software be sent from the internet server 103 and executed at the user's computer 104 through the web browser 105. This may be realized by various existing and known web enabled programming languages, such as Java, JavaScript, C#, ASP, AJAX, etc. In one embodiment, the software may be a JavaScript applet. A JavaScript applet for allowing a user to draw a curve as discussed herein is not difficult to write and is easily within the abilities of any person with skill in the art.

Referring back to FIG. 5, once the user has entered a curve the system may check whether the curve is valid at step 502. For the purposes of some embodiments of the invention, a valid curve must satisfy a property that all charts the curve is being compared to satisfy. That is, it must be a proper function. More specifically, when a valid curve is intersected by any vertical line, it may intersect that line at no more than a single point.

For example, FIG. 6A is a diagram of a valid curve 602. On the other hand, FIG. 6B, is an example of an invalid curve 603. It can be seen that vertical line 604 intersects the curve 603 at three points.

In an alternative embodiment of the invention, the software which allows the user to enter the curve may be specifically designed so that it does not allow a user to enter an invalid curve.

Once the curve has been entered and verified, the curve as well as all charts within the range is normalized. While the discussion above describes normalization with respect of various charts reflecting prices of traded items, the curve may be normalized in the same manner. Thus, the curve is treated as a plurality of data points, as are the stock charts. Again normalization for the curve and the charts may be based on magnitude, resolution, or both.

At step 506, each chart within the range is compared to the curve and similarity scores are obtained. At step 508, the highest x similarity scores are obtained. At step 510, the symbols and charts related to the highest scores are retrieved and displayed.

While the invention has been described in terms of particular embodiments and illustrative figures, those of ordinary skill in the art will recognize that the invention is not limited to the embodiments or figures described. Although embodiments of the present invention are described, in some instances, using HTML and HTTP terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 7:
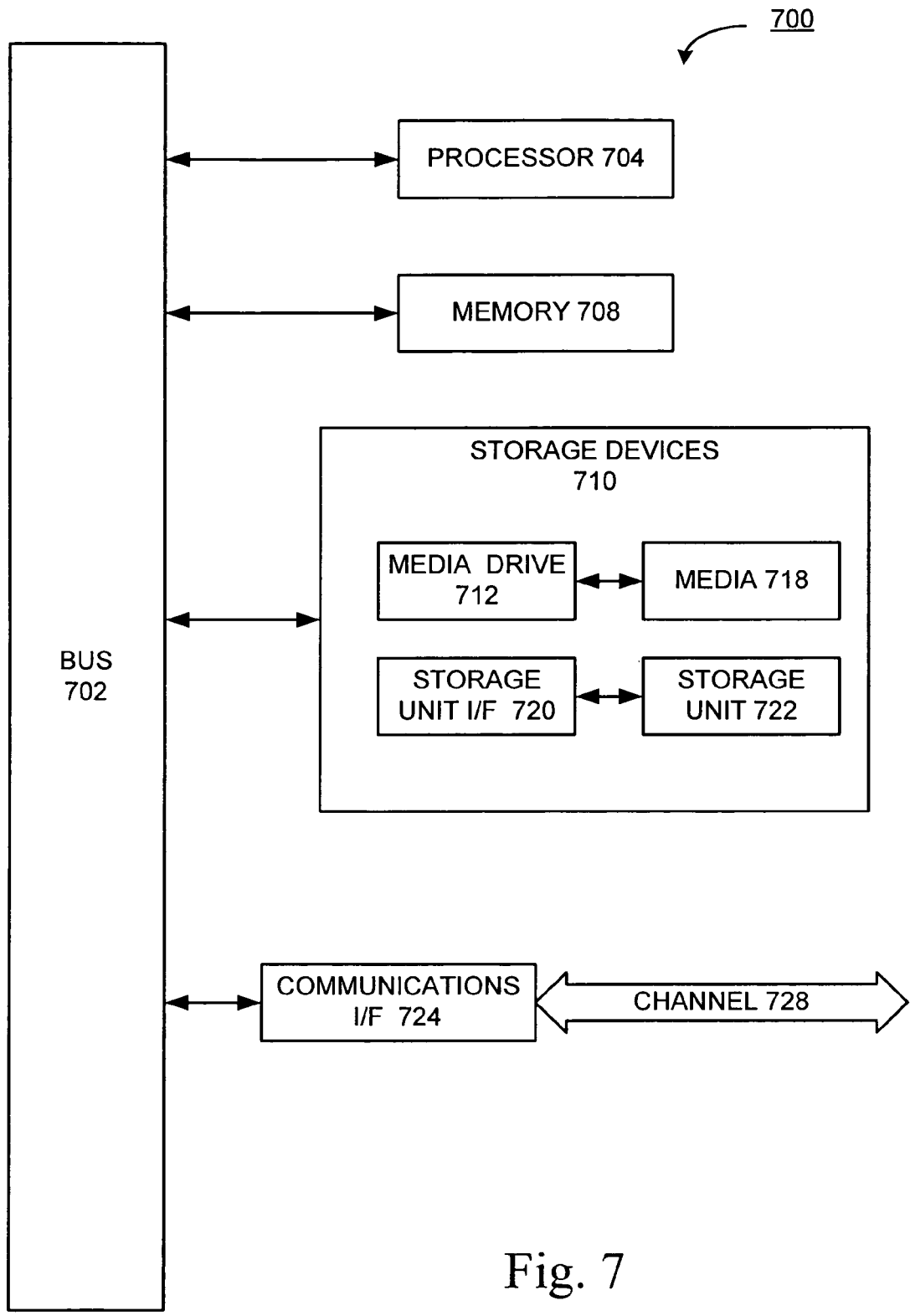
FIG. 7 illustrates a typical computing system that may be employed to implement processing functionality in embodiments of the invention.

FIG. 7 illustrates a typical computing system 700 that may be employed to implement processing functionality in embodiments of the invention. Computing systems of this type may be used in the SC, the radio controllers, the base stations, and the UEs, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as "computer program code" (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method comprising:
   receiving, by at least one computing device, a request from a user to find traded items having a price history similar to a price history of a first traded item, the request including an identification of the first traded item;
   automatically analyzing, by the at least one computing device, price histories of a plurality of traded items within a predefined range, the analyzing finding one or more similar traded items, each similar traded item having a price history over a predefined period that is similar to that of the first traded item, the analyzing the price histories including comparing the price history of each traded item within the predefined range with the price history of the first traded item, the comparing including applying a mathematical function that obtains a comparison score for each traded item within the predefined range, each comparison score indicating the level of similarity of the respective traded item with the first traded item, the analyzing further including identifying a predefined number of traded items having the highest similarity scores as the one or more similar traded items; and
   sending, by the at least one computing device, information identifying the similar traded items to the user.

2. The method of claim 1, wherein sending information to the user comprises sending to the user a chart of the price history of the first traded item over the predefined period, and one or more charts of the price histories of the one or more similar traded items.

3. The method of claim 1, wherein each price history is represented by a plurality of data points, and analyzing the price histories includes normalizing the magnitudes of the price histories by modifying the data points within one or more price histories so that they fit within a predefined range.

4. The method of claim 1, wherein each price history is represented by a plurality of data points, and analyzing the price histories includes normalizing the resolutions of the price histories by adding additional data points to one or more price histories, the magnitudes of the additional data points being based on mathematical projections based the magnitudes of data points neighboring the additional data points.

5. The method of claim 1, wherein each price history is represented by a plurality of data points, and analyzing the price histories includes normalizing the resolutions of the price histories by removing data points from one or more price histories.

6. The method of claim 1, wherein analyzing the price histories further includes:
   performing a pre-computed analysis of the price histories, said pre-computed analysis performing the analysis and identifying the one or more similar traded items for at least the first traded item, said pre-computed analysis being performed before the receiving a request step;
   saving the results of the performing a pre-computed analysis; and
   retrieving said results for the first traded item identified in the received request, said retrieving being performed after the receipt of the request.

7. A method comprising:
   receiving, by at least one computing device, a request from a user to find traded items having a charted price history similar to a reference curve specified by the user, the request including the user-specified reference curve;
   automatically analyzing, by the at least one computing device, price histories of a plurality of traded items within a predefined range, the analyzing the price histories including comparing the charted price history of each traded item of the plurality of traded items within the predefined range to the user-specified reference curve and obtaining a comparison score for each traded item, each comparison score indicating the level of similarity of the respective traded item with the user-specified reference curve, the analyzing finding one or more similar traded items, each similar traded item having a price history over the predefined range that when charted is similar to the reference curve; and
   providing, by the at least one computing device, information identifying the similar traded items to the user.

8. The method of claim 7, further including:
   providing, by the at least one computing device, the user with a curve input interface; and
   wherein the receiving of the request further comprises receiving, by the at least one computing device and from the user, the reference curve by way of the curve input interface.

9. The method of claim 8, wherein providing a user with a curve interface further includes sending a software application to a browser utilized by the user, the software application being executable at the browser to implement the curve input interface.

10. The method of claim 9, wherein the software application allows the user to input the reference curve, by drawing the reference curve.

11. The method of claim 7 wherein analyzing the price histories includes:
    obtaining a plurality of curve data points from the reference curve; and
    comparing the curve data points to data points comprised by the price histories of the plurality of traded items within the predefined period.

12. The method of claim 7, wherein receiving a request from the user further includes ensuring that the reference curve is a proper function.

13. A method comprising:
    receiving, by at least one computing device, a request from a user to find at least one group of two or more traded items having similar price histories;
    automatically analyzing, by the at least one computing device, price histories of a plurality of traded items within a predefined range, the analyzing finding one or more groups of similar traded items, each group of similar traded items comprising two or more traded items having price histories over a predefined period that are similar to each other, the analyzing the price histories including comparing the price history of each traded item within the predefined range with the price history of each other of the traded items by applying a mathematical function that obtains a comparison score for each traded item within the predefined range, each comparison score indicating the level of similarity of the respective traded item with the other traded item, the analyzing further including finding the one or more groups of similar traded items using the similarity scores;

ranking, by the at least one computing device, the groups of traded items according to the similarity of the price histories of the traded items within each group; and sending, by the at least one computing device, information identifying one or more of the highest ranked groups to the user.

14. A server system comprising:
a memory;
a processor; and
a network interface connected to the processor and connectable to a network;
wherein the processor is operable to receive through the network interface a request from a user to find traded items having a price history similar to a reference data set, the request including the reference data set, automatically analyze price histories of a plurality of traded items within a predefined range, the analyzing finding one or more similar traded items, each similar traded item having a price history over a predefined period that is similar to the reference data set, the analyzing the price histories including comparing the price history of each traded item within the predefined range with the reference data set, the comparing obtaining a comparison score for each traded item within the predefined range, each comparison score indicating the level of similarity of the respective traded item with the reference data set, the analyzing further including identifying a predefined number of traded items having the highest similarity scores as the one or more similar traded items; and
send through the network interface result information to the user, the result information including indications of the one or more similar traded items.

15. The server system of claim 14, wherein the reference data set is a reference curve defined by the user.

16. The server system of claim 15, wherein:
the memory includes a browser executable application which is operative to allow the user to draw the reference curve;
the processor is further operative to send the browser application to a browser being utilized by the user over the network interface; and
receiving a request from the user further comprises communicating with the browser executable application to receive the reference curve.

17. The server system of claim 14, wherein the predefined data set is the price history over the predefined time period of a first data item selected by the user.

18. The server system of claim 17, wherein the processor is further operative to perform the following as part of automatically analyzing the price histories:
perform a pre-computed analysis of the price histories, said pre-computed analysis performing the analysis and identifying the one or more similar traded items for at least the first data item, said pre-computed analysis being performed before the receipt of the request;
save the results of the pre-computed analysis in the memory; and
retrieve said results for the first data item, said retrieving being performed after the receipt of the request.

19. A computer readable non-transitory storage medium storing program code for causing performance of a method comprising:
receiving a request from a user to find traded items having a price history similar to a price history of a first traded item, the request including an identification of the first traded item;
automatically analyzing price histories of a plurality of traded items within a predefined range, the analyzing finding one or more similar traded items, each similar traded item having a price history over a predefined period that is similar to that of the first traded item, the analyzing the price histories including comparing the price history of each traded item within the predefined range with the price history of the first traded item, the comparing including applying a mathematical function that obtains a comparison score for each traded item within the predefined range, each comparison score indicating the level of similarity of the respective traded item with the first traded item, the analyzing further including identifying a predefined number of traded items having the highest similarity scores as the one or more similar traded items; and
sending information identifying the similar traded items to the user.

20. The computer readable medium of claim 19, wherein sending information identifying the similar traded items to the user comprises sending a chart of the price history of the first traded item over the predefined period, and one or more charts of the price histories of the one or more similar traded items.

21. The computer readable medium of claim 19, wherein each price history is represented by a plurality of data points, and analyzing the price histories includes normalizing the magnitudes of the price histories by multiplying the data points within one or more price histories, by a number, said number being selected for each price history causing the data points within that price history to fit within a predefined range.

22. The computer readable medium of claim 19, wherein each price history is represented by a plurality of data points, and analyzing the price histories includes normalizing the resolutions of the price histories by adding additional data points to one or more price histories, causing all price histories to include the same number of data points within the predefined time period, the magnitudes of the additional data points being based on mathematical projections based the magnitudes of data points neighboring to the additional data points.

23. The computer readable medium of claim 19, wherein each price history is represented by a plurality of data points, and analyzing the price histories includes normalizing the resolutions of the price histories by removing data points from one or more price histories, causing all price histories to include the same number of data points within the predefined time period.

24. The computer readable medium of claim 19, wherein analyzing the price histories further includes:
performing a pre-computed analysis of the price histories, the pre-computed analysis performing the analysis and identifying the one or more similar traded items for at least the first traded item, said pre-computed analysis step being performed before the receiving a request step;

saving the results of the performing a pre-computed analysis; and retrieving said results for the first traded item identified in the received request, said retrieving being performed after the receipt of the request.

25. A computer readable non-transitory storage medium storing program code for performing a method comprising:

receiving a request from a user to find traded items having a charted price history similar to a reference curve specified by the user, the request including the user-specified reference curve;

automatically analyzing price histories of a plurality of traded items within a predefined range, the analyzing the price histories including comparing the charted price history of each traded item of the plurality of traded items within the predefined range to the user-specified curve and obtaining a comparison score for each traded item, each comparison score indicating the level of similarity of the respective traded item with the user-specified reference curve, the analyzing finding one or more similar traded items, each similar traded item having a price history over the predefined range that when charted is similar to the reference curve; and sending information identifying the similar traded items to the user.

26. The computer readable medium of claim 25, wherein the method further includes:

providing the user with a curve input interface; and receiving, from the user, the reference curve by way of the curve input interface.

27. The computer readable medium of claim 26, wherein providing a user with a curve interface further includes sending a software application to a browser utilized by the user, the software application being executable at the browser to implement the curve input interface and to allow the user to draw the reference curve at the curve input interface.

28. The computer readable medium of claim 25, wherein analyzing the price histories includes:

obtaining a plurality of curve data points from the reference curve; and comparing the curve data points to data points comprised by the price histories of the plurality of traded items within the predefined period.

29. A computer readable non-transitory storage medium storing program code for causing performance of a method comprising:

receiving a request from a user to find at least one group of two or more traded items having similar price histories;

automatically analyzing price histories of a plurality of traded items within a predefined range, the analyzing finding one or more groups of similar traded items, each group of similar traded items comprising two or more traded items having a price histories over a predefined period that are similar to each other, the analyzing the price histories including comparing the price history of each traded item within the predefined range with the price history of each other of the traded items by applying a mathematical function that obtains a comparison score for each traded item within the predefined range, each comparison score indicating the level of similarity of the respective traded item with the other traded item, the analyzing further including finding the one or more groups of similar traded items using the similarity scores;

ranking the groups of traded items according to the similarity of the price histories of the traded items within each group; and sending information identifying one or more of the highest ranked groups to the user.

30. A server system comprising:

a memory;

a processor operable to perform:

receiving a request from a user to find traded items having a price history similar to a price history of a first traded item, the request including an identification of the first traded item;

automatically analyzing price histories of a plurality of traded items within a predefined range, the analyzing finding to one or more similar traded items, each similar traded item having a price history over a predefined period that is similar to that of the first traded item, the analyzing the price histories including comparing the price history of each traded item within the predefined range with the price history of the first traded item, the comparing including applying a mathematical function that obtains a comparison score for each traded item within the predefined range, each comparison score indicating the level of similarity of the respective traded item with the first traded item, the analyzing further including identifying a predefined number of traded items having the highest similarity scores as the one or more similar traded items; and sending information identifying the similar traded items to the user.

31. A server system comprising:

a memory;

a processor operable to perform:

receiving a request from a user to find traded items having a charted price history similar to a reference curve specified by the user, the request including the user-specified reference curve;

automatically analyzing price histories of a plurality of traded items within a predefined range, the analyzing the price histories including comparing a chart of the price history of each traded item of the plurality of traded items within the predefined range to the user-specified reference curve and obtaining a comparison score for the traded item, each comparison score indicating the level of similarity of the respective traded item with the user-specified reference curve, the analyzing finding one or more similar traded items, each similar traded item having a price history over the predefined range that when charted is similar to the reference curve; and sending information identifying the similar traded items to the user.

* * * * *